(12) United States Patent
Yamashita

(10) Patent No.: US 6,223,034 B1
(45) Date of Patent: Apr. 24, 2001

(54) APPARATUS AND METHOD FOR MOBILE COMMUNICATIONS

(75) Inventor: Osamu Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/139,407

(22) Filed: Aug. 25, 1998

(30) Foreign Application Priority Data

Aug. 25, 1997 (JP) .................................................. 9-228052

(51) Int. Cl.⁷ .............................. H04Q 7/20; H04Q 7/32
(52) U.S. Cl. ......................... 455/426; 455/432; 455/127; 455/569; 455/345; 455/346; 455/550; 455/441
(58) Field of Search ................................. 455/426, 421, 455/422, 462, 550, 445, 465, 552, 567, 571, 575, 345, 432, 127, 569, 344, 346, 90, 441

(56) References Cited

U.S. PATENT DOCUMENTS

| | | | |
|---|---|---|---|
| 4,718,080 | * | 1/1988 | Serrano et al. ....................... 455/426 |
| 5,309,502 | * | 5/1994 | Hirai .................................... 455/462 |
| 5,367,558 | * | 11/1994 | Gillig et al. .......................... 455/426 |
| 5,787,348 | * | 7/1998 | Willey et al. ........................ 445/441 |
| 5,930,729 | * | 7/1999 | Khamis et al. ....................... 455/571 |

* cited by examiner

*Primary Examiner*—William G. Trost
*Assistant Examiner*—Keith Furguson
(74) *Attorney, Agent, or Firm*—Young & Thompson

(57) ABSTRACT

Connection of a car adapter or a car battery in an automobile to a portable radio communication apparatus is detected; communication with a communication system not warranting communication during fast transit is forbidden; and switching over to a communication system warranting it is accomplished.

9 Claims, 4 Drawing Sheets

APPARATUS AND METHOD FOR MOBILE COMMUNICATIONS

BACKGROUND OF THE INVENTION

1. Field of the Invention

The present invention relates to an apparatus for mobile communications, and more particularly to an apparatus and a method usable with a plurality of communications systems.

2. Description of the Related Art

At present, there are a variety of communications systems in use, differing with geographical area and application among other factors. For instance, there are the second generation personal handy phone system (PHS) and cordless systems, which are relatively inexpensive by virtue of the simplicity of network but do not warrant communication capability when in high speed transit. On the other hand, there are mobile telephone and cellular systems which do warrant communication capability in fast transit by virtue of steps taken against such disturbing factors as hand-over and fading though involving relatively high communication costs. Furthermore, there are pager systems allowing only reception while in transit.

Each of these many communications systems has its own hardware, such as PHS terminals and portable telephones.

However, with a view to enhancing the convenience of the users of such mobile wireless terminals, there are proposed portable wireless terminals which permit connection to a plurality of communication systems with a single unit.

It is considered preferable, in view of the cost of communication, for such a portable wireless terminal connectable to a plurality of communication systems, e.g. a cordless system and a cellular system, to preferentially access the cordless system. If access to the cordless system is given priority, even when the terminal is in a fast moving body, such as an automobile, access will be made to the cordless system which intrinsically does not warrant communication capability. In this case, when the bearer of the terminal has just got on the automobile, or the vehicle is waiting for a green light or running at a low enough speed not to affect communication, there will be no problem, but it is unrealistic to expect the vehicle to be always running so slowly or at halt. Therefore, if the bearer, while riding a vehicle, stands by or initiates a call via the cordless system, the conversation may be interrupted when the vehicle accelerates beyond a certain speed.

SUMMARY OF THE INVENTION

An object of the present invention is to solve the above-described problem, and to provide an improved apparatus for mobile communications.

Another object of the invention is to provide an apparatus for mobile communications capable of automatically accessing the most suitable system for intended communication.

Still another object of the invention is to provide an apparatus for mobile communications capable of perceiving for itself, when it is used in a mobile object such as an automobile, its presence in a mobile object, and automatically forbidding access to any communication system unsuitable for communication during high speed transit.

In order to achieve the above-stated objects, according to the invention, there is provided an apparatus for mobile communications comprising a plurality of radio communication sections capable of communicating with a plurality of communication systems, and a control section for selecting and using one of the plurality of radio communication sections, wherein the control section judges whether or not communication during high speed transit is possible and, if it is possible, gives priority to a radio communication section communicating with a system appropriate for communication during high speed transit, and forbids a radio communication section communicating with a system inappropriate for communication during high speed transit from standing by or initiating a call.

The control section should preferably judge the possibility of communication during high speed transit according to whether or not the apparatus is to be used in an automobile.

The control section can judge the possibility of communication during high speed transit by the presence or absence of connection to a car adapter or a car battery.

It is further preferable for the apparatus to have a notifying section for issuing an alarm to its user if the control section detects the possibility of communication during high speed transit when communication is being accomplished by a radio communication section unsuitable for communication during high speed transit.

It is desirable for the control section to automatically process call release after the alarm section has issued an alarm.

According to the invention, there is also provided an apparatus for mobile communications comprising a first radio communication section capable of communication during high speed transit; a second radio communication section incapable of communication during high speed transit; a control section for selecting and using either the first or the second radio communication section; and a judging section for judging whether or not communication during high speed transit is possible; wherein the control section, if the judging section judges communication during high speed transit is possible, gives priority to the first radio communication section by forbidding the second radio communication section from standing by or initiating a call.

An alarm should preferably be issued if the judging section detects the possibility of communication during high speed transit when communication is being accomplished by the second radio communication section.

After the power supply is turned on, if the judging section finds the possibility of communication during high speed transit, preferably the first radio communication section should be caused to stand by, or if the judging sections finds no possibility of communication during high speed transit, preferably both the first and the second radio communication sections should be caused to stand by.

When the judging section finds the possibility of communication during high speed transit after an action to initiate a call or during conversation, if the second radio communication section is selected, an alarm should desirably be issued or, if the first radio communication section is selected, no alarm should desirably be issued.

Judgment of the possibility of communication during high speed transit by the judging section should preferably be accomplished according to whether or not the apparatus is connected to a car adapter or a car battery.

BRIEF DESCRIPTION OF THE DRAWINGS

These and other objects, features and advantages of this invention will become more apparent from the following detailed description when taken in conjunction with the accompanying drawings in which.

In the drawings, the same reference numerals denote the same structural elements.

DETAILED DESCRIPTION OF THE PREFERRED EMBODIMENTS

Next, the present invention will be described in detail with reference to the drawings.

Figure 1:
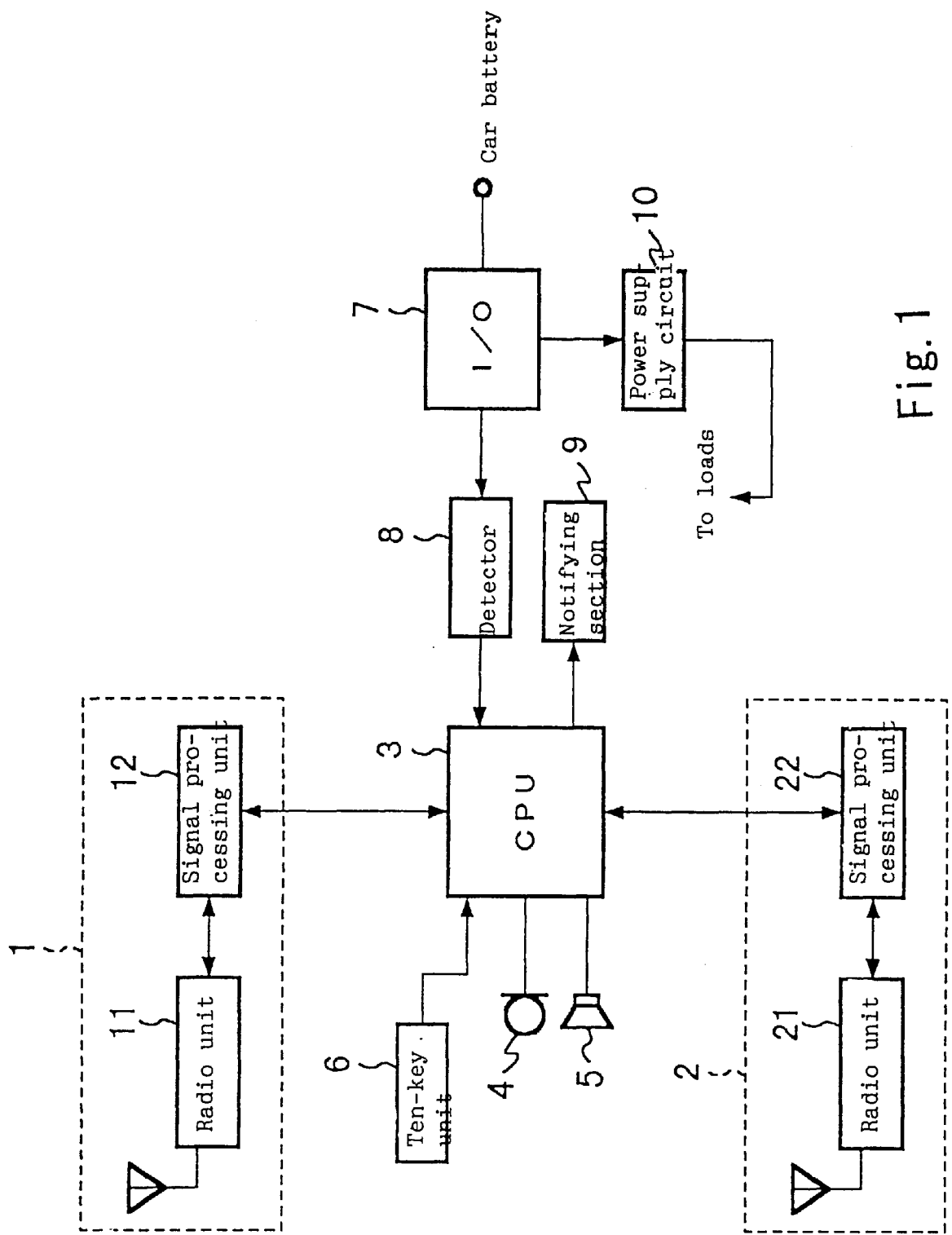
FIG. 1 is a block diagram showing the configuration of a preferred embodiment of the invention.

FIG. 1 is a block diagram illustrating the configuration of a preferred embodiment of the invention.

In FIG. 1, a first radio communication section 1 is a communication system not warranting communication capability when in fast transit, preferably means of communication which makes possible connection to a cordless system such as PHS. A second radio section 2 is a communication system warranting communication capability when in fast transit, preferably means of communication which makes possible connection to a cellular system such as a portable telephone. The radio communication section 1, including a transmitter/receiver, consists of a first radio unit 11 for processing and frequency conversion of high frequency signals, and a first signal processing unit 12 for processing baseband signals. Similarly, the radio communication section 2, including a transmitter/receiver, consists of a second radio unit 21 for processing and frequency conversion of high frequency signals, and a second signal processing unit 22 for processing baseband signals.

These first and second radio communication sections may either have an independent antenna each or a common antenna, which can be switched over between them.

A central processing unit (CPU) 3 controls at least the first and second radio communication sections 1 and 2. This control includes known control for each radio communication section and the control of switching over between them as will be described in detail elsewhere in this specification.

A microphone 4, a receiver 5 and a ten-key unit 6 are known items, and the first two are used for conversation. The ten-key unit 6, intended for entering the other party's telephone number and other data, preferably should include various function keys.

An interface (I/O) 7 is intended for interfacing between a battery for supplying power to a mobile body, such as an automobile, and an adapter, i.e. between a car battery and a car adapter in an automotive environment. A detector 8 detects any connection between the car battery and the interface 7, and supplies a detection signal to the CPU 3. This detection signal may be supplied to the CPU 3 either only when connection has been detected, or as a signal differing with the presence or absence of connection to enable the CPU 3 to judge whether or not connection is present. Or else, the detection signal may as well be supplied according to the presence or absence not only of mechanical connection but also of electrical connection, i.e. depending on whether or not a power source voltage is detected.

The CPU 3, when a detection signal indicating connection to the car battery is entered, judges that the mobile communications apparatus is in an automobile, and that communication during high speed transit is possible if desired. The CPU 3 forbids communication access by the radio communication section 1, which is inappropriate for communication during high speed transit, and automatically switches over to communication access by the radio communication section 2, which is appropriate for communication during high speed transit. Preferably, when communication is not taking place, the radio communication section 2 should be used for initiating and receiving subsequent calls, and when communication is taking place, an alarm should be issued by a notifying section 9 to the user, who is enabled by the alarm from the notifying section 9 to recognize that communication is currently taking place using the radio communication section 1.

The notifying section 9 can also serve as a loudspeaker for issuing usual ringing sounds. In this case, it should desirably notify the connection by a different sound from the usual ringing sound.

A power supply circuit 10 receives power supply from the car battery via the interface 7, converts it to voltages appropriate for different loads, and supplies them to their respective destinations. In FIG. 1, the illustration of a usually employed power source, such as a detachable battery, is dispensed with. As, upon detection of connection to the car battery, the consumption of power from the detachable battery can be saved by having the car battery supply power to elements of the communications apparatus, the car battery can be caused to supply power to those elements. Control of such power source switching should preferably be accomplished by the CPU 3. Thus, upon detection of connection to the car battery, the CPU3 should preferably replace power feed from the detachable battery with power feed from the power supply circuit 10.

Next will be described the operation of the mobile communications apparatus according to the invention shown in FIG. 1.

When the first radio communication section 1 is to be used, a radio signal in a cordless system, received by the radio unit 11 via an antenna, is supplied to the signal processing unit 12 after going through frequency conversion. The signal processing unit 12, to which the frequency-converted signal is entered from the radio unit 11, decodes or otherwise processes the signal. A speech signal from the signal processing unit 12 is supplied from the CPU 3 to the receiver 5. On the other hand, speech from the microphone 4 is supplied from the CPU 3 to the signal processing unit 12, where it undergoes processing such as encoding, is converted into a radio signal by the radio unit 11, and sent out from the antenna.

When the second radio communication section 2 is to be used, a radio signal in a cellular system, received by the radio unit 21 via an antenna, is supplied to the signal processing unit 22 after going through frequency conversion. The signal processing unit 22, to which the frequency-converted signal is entered from the radio unit 21, decodes or otherwise processes the signal. A speech signal from the si gnal processing unit 22 is supplied from the CPU 3 to the receiver 5. On the other hand, speech from the microphone 4 is supplied from the CPU 3 to the signal processing unit 22, where it undergoes processing such as encoding, is converted into a radio signal by the radio unit 22, and sent out from the antenna.

The switching between these first and second radio communication sections can be select ed by the user's manipulation of the ten-key unit 6.

When a detection signal indicating the connection of the car battery via the interface 7 is entered from the detector 8, the CPU 3 will judge that a communication system appropriate for communication during high speed transit should be selected. At this time, it also judges whether or not communication is taking place. If it is not, the radio communication section 2 will be set in a standby state and, if there is a call initiating instruction from the ten-key unit 6, communication will be accomplished using the radio communication section 2. Or if communication is taking place, the notifying section 9 will notify the user so that he or she can recognize the possibility that high speed transit may take place.

The CPU 3, upon establishment of connection with the car battery, effects control so as to have power supplied from the power supply circuit 10.

If, in a standby state, the selection of either radio communication section is fixed, no signal can be received from the unselected communication system. Therefore, it is preferable to switch over at prescribed time intervals and receive control signals. Furthermore, in a state where connection to the car battery is not detected, standby should preferably be done with both radio communication sections. In this case, each radio communication section needs an independent antenna of its own.

Next will be described, with reference to the flow chart of FIG. 2, actions from the actuation of the power source in the mobile communications apparatus until a standby state is reached.

Figure 2:
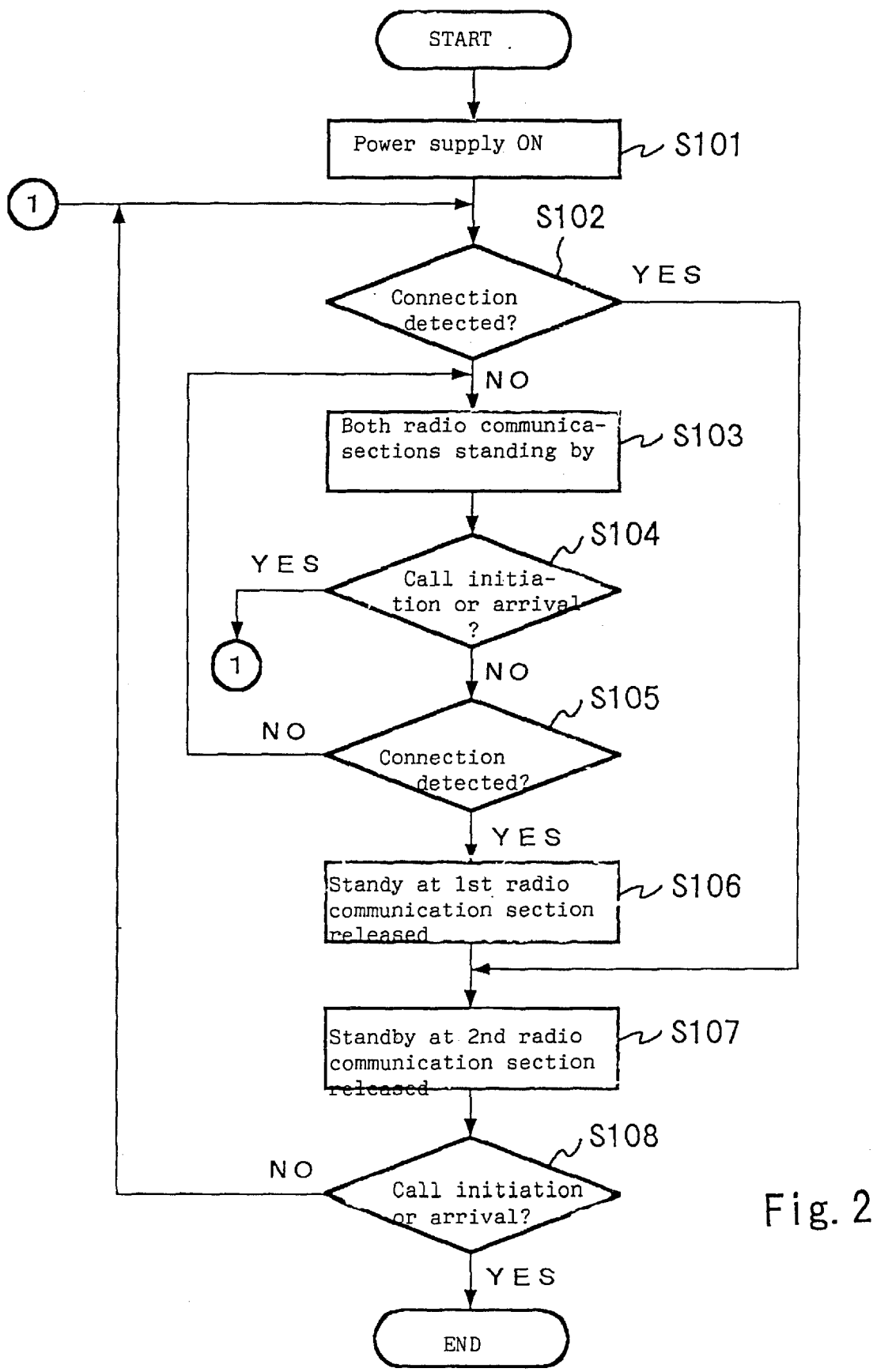
FIG. 2 is a flow chart for describing a standby state of the mobile communications apparatus illustrated in FIG. 1.

In FIG. 2, when the power source of the mobile communications apparatus is turned on (step S101), the CPU 3 judges whether or not a detection signal is supplied from the detector 8 (step S102). The CPU 3, if it judges that no detection signal is supplied (S102, NO), will set both first and second radio communication sections 1 and 2 in a standby state (step S103). Thus the apparatus is enabled to receive radio signals from both cordless and cellular communication systems.

After that, with neither call initiation nor call arrival taking place (step S104, NO), both radio communication sections are kept in a standby state (step S105, NO).

On the other hand, upon supply of a detection signal (step S105, YES), the first radio communication system 1 is either forbidden or released from the standby state (step S106), and only the second radio communication section 2 is kept in the standby state (step S107). Thus, standby with the cordless system is forbidden, and a mode of standby with the cellular system is entered into.

After that, until either call initiation or call arrival is detected (step S108), steps from S102 through S107 are repeated.

Incidentally, after the power source is turned on in the processing at step S101, if a detection signal is supplied (step S102, YES), only the second radio communication section 2 will enter into a standby mode (step S107).

Next will be described the actions of call initiation processing with reference to the flow chart of FIG. 3.

Figure 3:
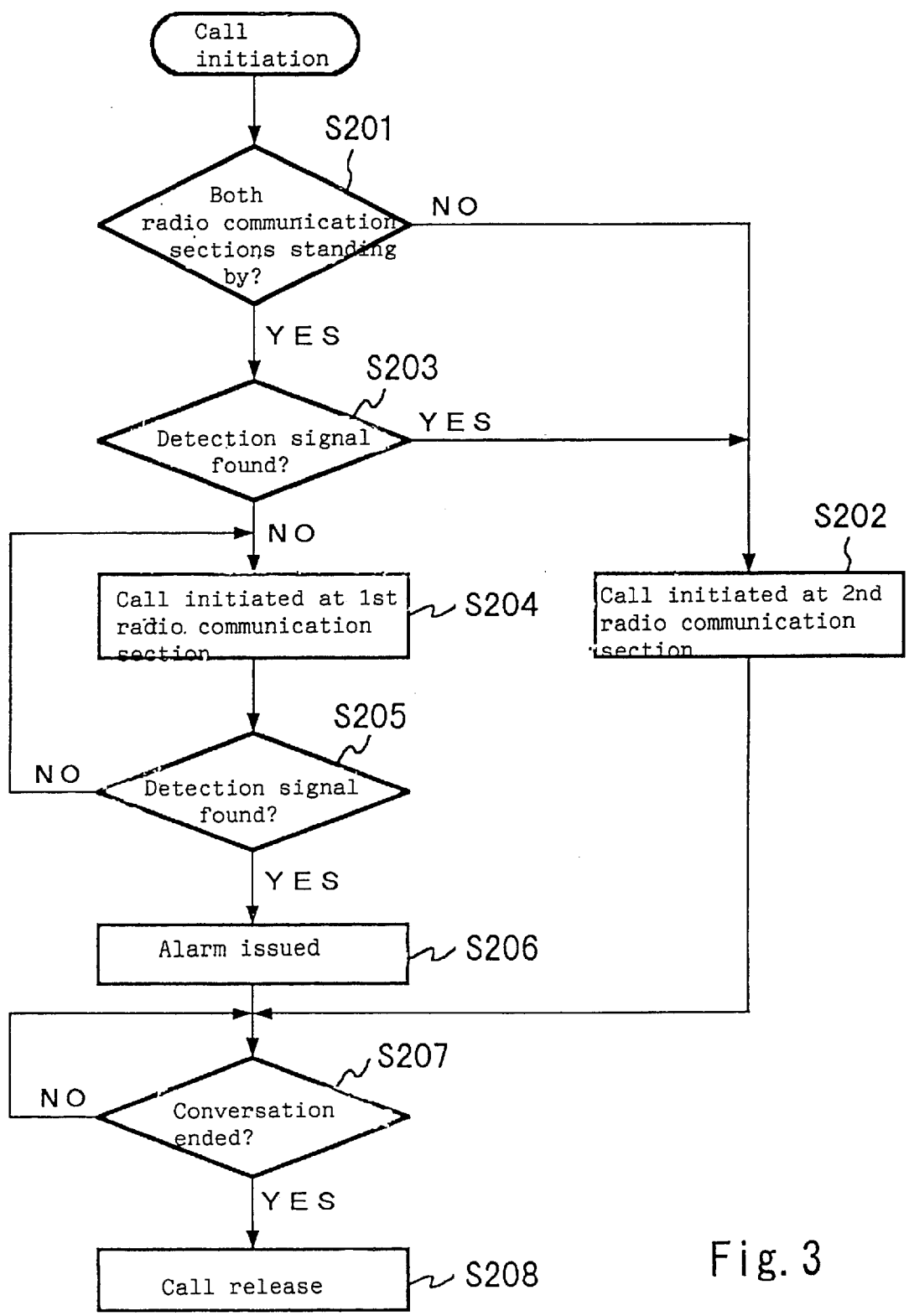
FIG. 3 is a flow chart for describing a call initiating operation by the mobile communications apparatus illustrated in FIG. 1.

Referring to FIG. 3, when call initiation is done from the ten-key unit 6, the CPU 3 checks the standby state of the radio communication sections (step S201). If only the second radio communication section 2 is standing by (step S201, NO), call initiation will be processed by the second radio communication section 2 (step S202).

Or, if both radio communication sections are standing by (step S201, YES), the CPU 3 will check the presence or absence of a detection signal (step S203). If a detection signal is detected in the processing at step S203 (step S203, YES), call initiation processing will be done by the second radio communication section 2 (step S202).

If no detection signal is detected (step S203, NO), call initiation processing will be done (step S204) by the first radio communication section 1 out of consideration for the cost of communication. After that, the CPU 3 monitors the detection of any detection signal (step S205) and, if one is detected, will issue an alarm from the notifying section 9 (step S206).

If the user recognizes the alarm and ends his or her conversation (step S207, YES), the CPU 3 will execute call release processing (step S208).

For a call initiated by the second radio communication section 2 as well, if the user ends the call, call release processing is executed.

To add, though the flow chart of FIG. 3 has no step for detection signal checking after the processing at step S202, detection signal checking may be done periodically. However, as this would entail no need for control such as switching over, processing at the subsequent steps would be no different.

Further in FIG. 3, call release is executed in response to call ending by the user, but the CPU 3 may execute call release after the issue of the alarm irrespective of the user's intention. In this case, it is preferable to automatically execute call release after the lapse of a prescribed length of time following the issue of the alarm.

Next will be described the operation during conversation with reference to the flow chart of FIG. 4.

Figure 4:
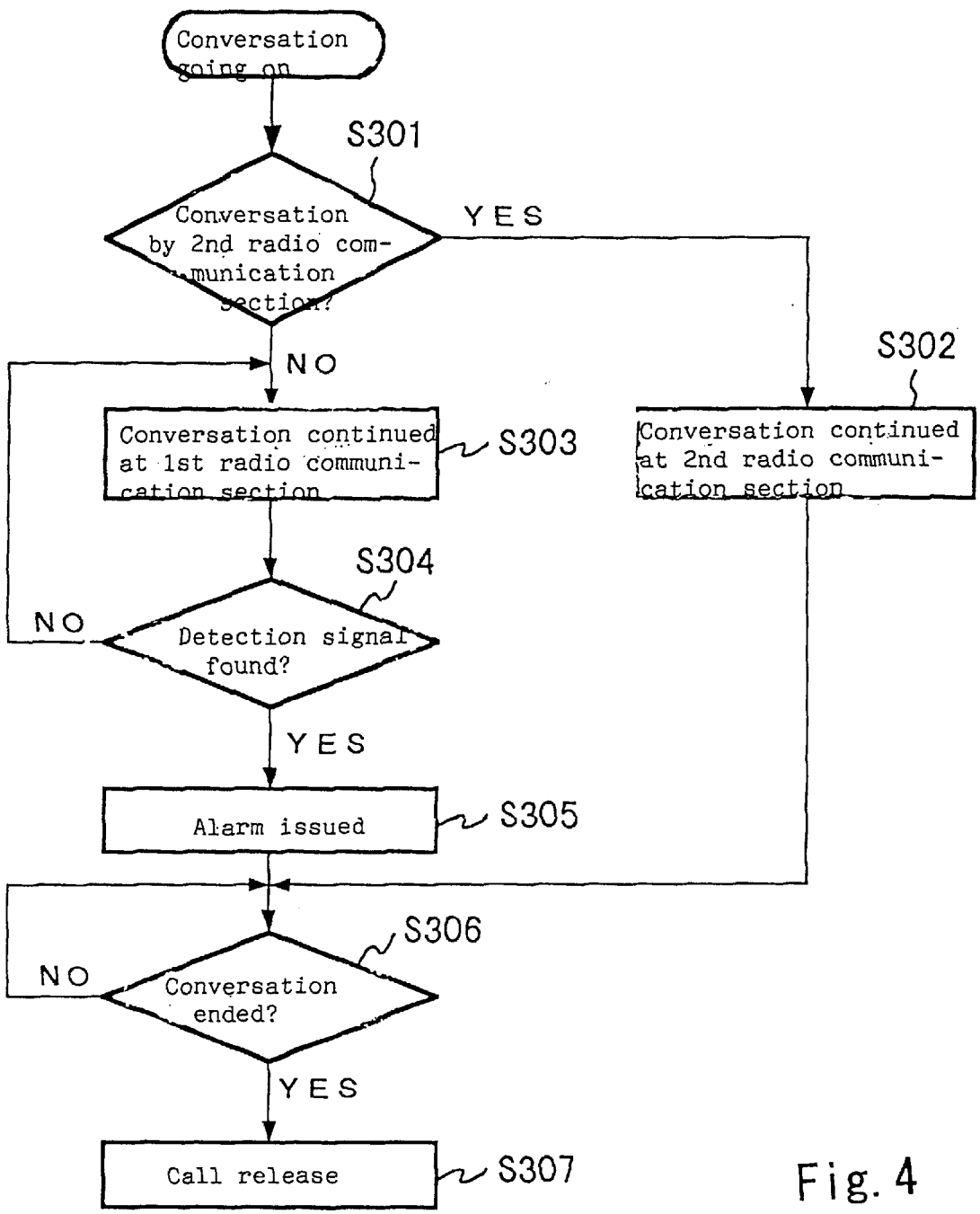
FIG. 4 is a flow chart for describing the operation by the mobile communications apparatus illustrated in FIG. 1 during conversation.

Referring to FIG. 4, the CPU 3 judges whether or not the conversation is using the second radio communication section 2 (step S301). If it is, the conversation will be allowed to continue as it is (step S302).

Or if the conversation is using the first radio communication section 1, with the continuing state of that conversation being maintained (step S303), the presence or absence of a detection signal will be judged (step S304). If there is a detection signal, an alarm will be issued from the notifying section 9 (step S305).

As the user ends the conversation in response to this alarm (step S306, YES), the CPU 3 will execute call release (step S307). Or if the conversation continuing at the second radio communication section 2 is ended on the way, the CPU 3 will also execute call release.

Incidentally, though call release is executed in response to conversation ending by the user after the issue of an alarm according to FIG. 4, call release may as well be automatically executed after a certain period of time as stated above. The presence or absence of a detection signal may also be checked periodically even when conversation is taking place at the second radio communication section 2.

As hitherto described, the present invention makes it possible to automatically select a system suitable for a given environment of use, because a communication system which warrants communication during high speed transit and another system which does not are selectively used by judging the possibility of fast transit.

Also, the invention permits automatic system selection by detecting connection with a car adapter or a car battery used in the automobile.

Furthermore, the invention makes it possible to prevent interruption of communication during conversation, which is unpleasant to the user, because the optimal system for a given environment of the use of the mobile communications apparatus is selected.

While the invention has been described with reference to a specific embodiment thereof, it will be appreciated by those skilled in the art that numerous variations, modifications, and embodiments are to be regarded as being within the spirit and scope of the invention.

What is claimed is:

1. An apparatus for mobile communication comprising:
   a plurality of radio communication units capable of communicating with a plurality of communication systems;
   a detector that detects a state wherein the apparatus can be used during high speed transit to output a first detection signal before call initiation by the plurality of radio communication units; and
   a controller coupled to said detector, that gives priority to one of said radio communication units which communicates with one of communication systems appropriate for communication during high speed transit when the detection signal is supplied from said detector.

2. An apparatus for mobile communications, as claimed in claim 1, wherein said detector detects the state when the apparatus is to be used in an automobile.

3. An apparatus for mobile communications, as claimed in claim 2, further comprising:
   an interface unit coupled to said detector, said interface unit being connectable to a car adapter or a car battery, wherein
   said detector out-puts the detection signal when said interface unit is connected to the car adapter or the car battery.

4. An apparatus for mobile communications, as claimed in claim 1, wherein said detector detects the state when one of said radio communication unit communicates with a communication system inappropriate for communication during high speed transit to output a second detection signal, the apparatus further comprising:
   a notifying unit that generates a notification signal when said detector outputs the second detection signal.

5. An apparatus for mobile communication, as claimed in claim 4, wherein said controller automatically processes call release after said notifying unit has generated the notification signal.

6. An apparatus for mobile communication comprising:
   a first radio communication unit capable of communication during high speed transit;
   a second radio communication unit unsuitable for communication during high speed transit;
   a detector that detects to output a first detection signal a state wherein the apparatus can be used during the high speed transit, before either call initiation or call arrival takes place; and
   a controller coupled to said detector, that gives priority to said first radio communication unit by forbidding said second radio communication unit from standing by or initiating a call when the first detection signal is supplied from said detector.

7. An apparatus for mobile communication, as claimed in claim 6, wherein said detector detects the state when communication is being accomplished by said second radio communication, thereby outputting a second detection signal to issue an alarm.

8. An apparatus for mobile communications, as claimed in claim 6, wherein, after the power supply of the apparatus is turned on, if said detector outputs the first detection signal, said first radio communication unit is caused to stand by, or if said detector does not output the first detection signal, both said first and second radio communication units are caused to stand by.

9. An apparatus for mobile communication, as claimed in claim 6, wherein said detector detects connection to a car adapter or a car battery to detect the state.

* * * * *